United States Patent [19]
Ohtaki et al.

[11] Patent Number: 5,276,324
[45] Date of Patent: Jan. 4, 1994

[54] COMPOSITE SCANNING TUNNELING MICROSCOPE

[75] Inventors: Tatsuro Ohtaki, Tokyo; Hideaki Ohkubo, Yokohama; Hiroyuki Matsushiro, Machida, all of Japan

[73] Assignee: Nikon Corporation, Tokyo, Japan

[21] Appl. No.: 921,130

[22] Filed: Jul. 29, 1992

[30] Foreign Application Priority Data

Aug. 8, 1991 [JP] Japan .................................. 3-199461

[51] Int. Cl.[5] ............................................. H01J 37/00
[52] U.S. Cl. ..................................... 250/306; 250/307
[58] Field of Search .................................. 250/306, 307

[56] References Cited

U.S. PATENT DOCUMENTS

| | | | |
|---|---|---|---|
| 4,914,293 | 4/1990 | Hayashi et al. | 250/306 |
| 5,083,022 | 1/1992 | Miyamoto et al. | 250/306 |
| 5,206,702 | 4/1993 | Kato et al. | 250/306 |

FOREIGN PATENT DOCUMENTS

| | | |
|---|---|---|
| 0331148 | 9/1989 | European Pat. Off. . |
| 0405973 | 1/1991 | European Pat. Off. . |
| 0406413 | 1/1991 | European Pat. Off. . |
| 0421354 | 4/1991 | European Pat. Off. . |
| 2-16403 | 1/1990 | Japan . |

OTHER PUBLICATIONS

Yasutake et al., "Scanning Tunneling Microscope Combined with Optical Microscope for Large Sample Measurement", *Journal of Vacuum Science and Technology A*, vol. 8, Jan. 1990, pp. 350-353.

*Primary Examiner*—Constantine Hannaher
*Assistant Examiner*—Kiet T. Nguyen
*Attorney, Agent, or Firm*—Shapiro and Shapiro

[57] ABSTRACT

A composite scanning tunneling microscope comprises a first objective optical system for collimating an optical flux from a sample, a second objective optical system for condensing the optical flux thus collimated, and a transparent member disposed between the first and the second objective optical systems. A through hole is perforated along an optical axis in the center of the first objective optical system. A tube scanner member has a probe for detecting a tunnel current disposed at one end thereof. The tube scanner member passes through the hole of the first objective optical system without a contact therewith. The other end of the tube scanner member is fixed to the transparent member. The tube scanner member fixed to the transparent member is separate from and independent of an optical microscope, so that a tunnel current may stably be detected without influences on the probe from vibrations of the optical microscope.

9 Claims, 4 Drawing Sheets

COMPOSITE SCANNING TUNNELING MICROSCOPE

BACKGROUND OF THE INVENTION

1. Field of the Invention

The present invention relates to a scanning tunneling microscope. More particularly, the present invention relates to a composite scanning tunneling microscope, in which a tunneling microscope is combined with an optical microscope.

2. Related Background Art

A conventional example of composite tunneling microscope is disclosed in Japanese Patent Application Laid-open No. 2-16403. This example is briefly explained in the following.

As shown in FIG. 6, a tunneling microscope as disclosed in the above Laid-open Patent has a probe 2 for tunnel current detection unitedly fixed on an objective lens 1, which detects a very weak electric current from the probe 2 through a conductive layer 3.

Further, the above Laid-open Patent describes another tunneling microscope as shown in FIG. 7, in which a glass plate 5, which does not affect an optical image, is disposed between an objective lens 1 and a sample 4 and in which a probe 6 is attached to the glass plate 5. In this example, the glass plate 5 is fixed to a lens barrel supporting the objective lens 1 or to a housing of the microscope.

Since the probe is unitedly incorporated into the optical microscope in the above conventional composite tunneling microscopes, vibrations of the optical microscope are readily transmitted to the probe of the tunneling microscope, which results in inability to obtain a high resolving power of atomic level based on detection of tunnel current.

The incorporation of the probe with the objective lens is not easy in position adjustment to set the probe at a position where the tip of probe is located in a depth of focus of the optical microscope, which leads to difficulties in exchange of probe.

SUMMARY OF THE INVENTION

It is an object of the present invention to provide a composite scanning tunneling microscope enabling to achieve a high resolving power of atomic level.

It is another object of the present invention to provide a composite scanning tunneling microscope improved in workability of probe mounting.

It is still another object of the present invention to provide a composite scanning tunneling microscope having a good response in probe scanning.

A tunneling microscope of the present invention comprises a first objective optical system for collimating an optical flux from a sample, a second objective optical system for condensing the optical flux thus collimated, and a transparent member disposed between the first and the second objective optical systems. A through hole is perforated along an optical axis in the center of the first objective optical system. A tube scanner member has a probe for detecting a tunnel current, which is disposed at one end of the scanner. The tube scanner member passes through the hole of the first objective optical system without a contact therewith. The other end of the tube scanner member is fixed to the transparent member.

The tube scanner member fixed to the transparent member is separate from and independent of an optical microscope, so that a tunnel current may stably be detected without influences on the probe from vibrations of the optical microscope. The first and the second objective optical systems are displaceable independently of the tube scanner member, so that the tip of probe may readily be made coincident with the depth of focus of the objective optical systems by moving them along an optical axis thereof. The tube scanner member disposed in the center of the objective optical systems may be formed small in outer diameter, and therefore a response of probe scanning may be improved.

DESCRIPTION OF THE PREFERRED EMBODIMENTS

There are preferred embodiments according to the present invention explained with reference to the accompanying drawings.

Figure 1:
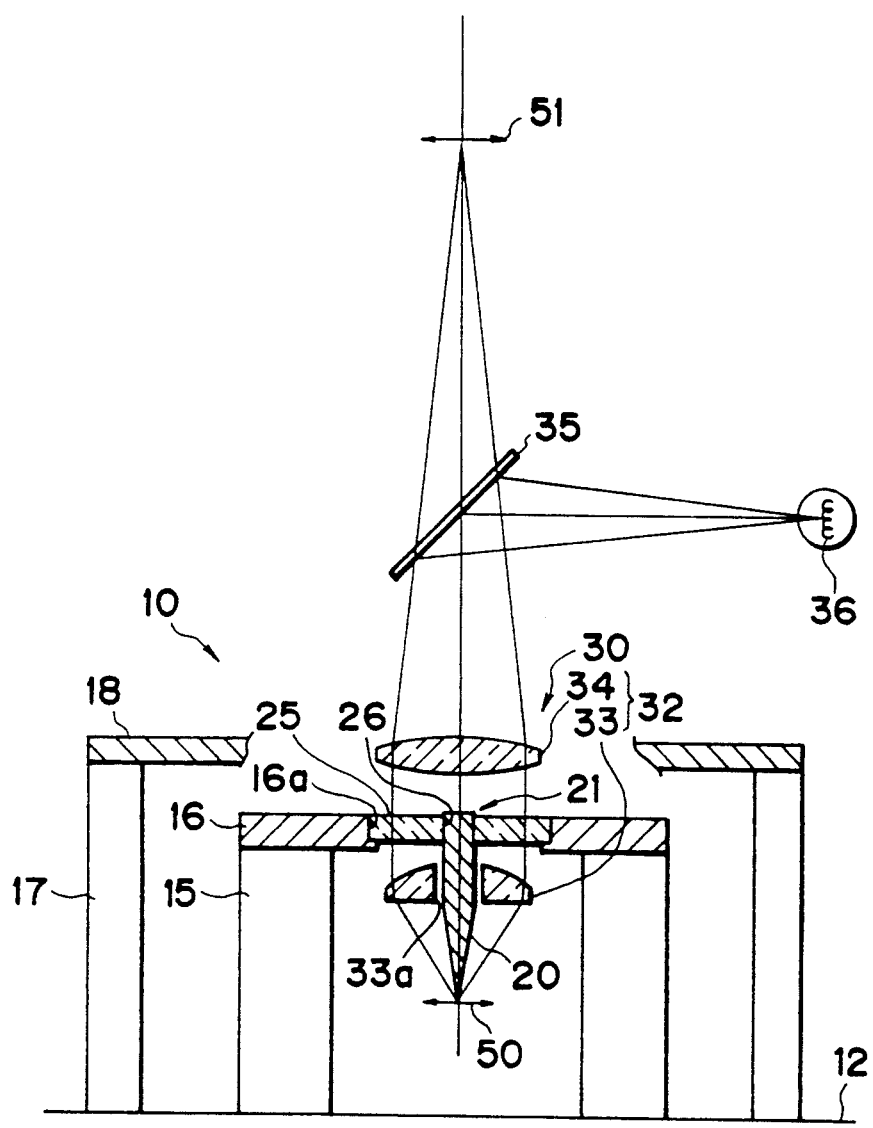
FIG. 1 is a sectional view to show a schematic structure of a tunneling microscope in an embodiment according to the present invention.

FIG. 1 shows an embodiment of a composite scanning tunneling microscope, which is composed of a scanning tunneling microscope 10 and an optical microscope 30. The scanning tunneling microscope 10 is supported by a support plate 16 on a column 15 standing on a vibration isolating table 12, which may observe unevenness on a surface of sample 50 by scanning the sample 50 with a probe 20.

The optical microscope 30 is provided for simultaneous observation of the tip of probe 20 and of the surface of a sample, which is supported by a support plate 18 on a column 17 standing on the vibration isolating table 12. The optical microscope 30 is provided with an objective optical system 32 for forming a magnified image 51 of the sample 50 on an optical axis thereof. The objective optical system 32 comprises a first objective optical system 33 for collimating an optical flux from the sample 50 and a second objective optical system 34 for forming an image 51 while condensing the optical flux collimated. Although the first and the second objective optical systems 33, 34 are respectively represented by a single lens in FIG. 1, they are usually composed of a plurality of lenses. There is an unrepresented mechanism provided for moving the objective optical system 32 along the optical axis to align the probe 20 in the depth of focus of the objective optical system.

A drop light illumination device is incorporated in the optical microscope 30. The drop light illumination device is provided with a half mirror 35 disposed on the optical axis between the magnified image 51 and the second objective optical system 34, and with an illumination light source 36.

A circular through hole 33a is perforated in the first objective optical system 33 around the optical axis, and a tube scanner member 21 passes through the hole 33a without a contact with the first objective optical system 33.

Figure 2:
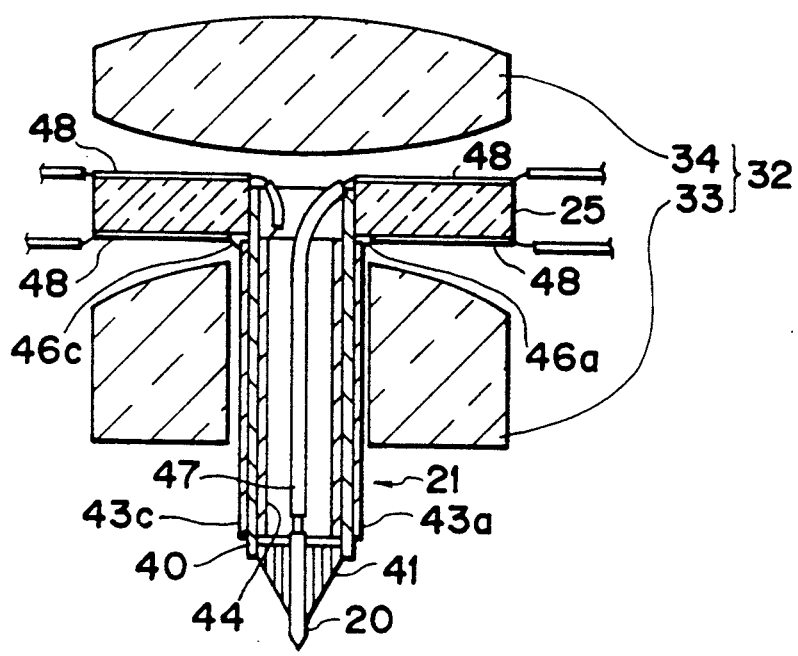
FIG. 2 is a sectional view of main part of FIG. 1.
Figure 3:
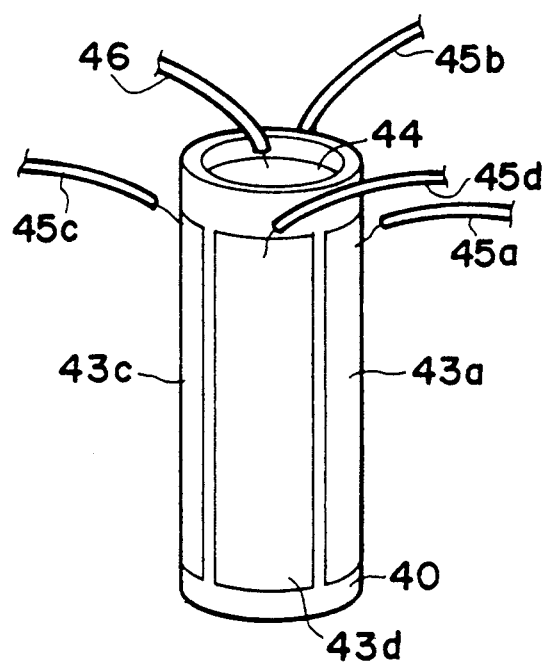
FIG. 3 is a perspective view to show a tube scanner member.

The tube scanner member 21 comprises a cylindrical piezoelectric ceramics 40, a holder 41 supporting the probe 20, and an electrode group attached to an outer circumference and an inner circumference of the piezoelectric ceramics 40, as shown in FIGS. 2 and 3. The electrode group consists of four plate electrodes 43a, 43b, 43c, 43d disposed outside the tube scanner member 21, and a ground electrode 44 disposed inside the member 21. Electrode wires 45a, 45b, 45c, 45d and a ground wire 46 are respectively connected to the electrodes 43a, 43b, 43c, 43d and to the ground electrode 44, and withdrawn therefrom. A tunnel current signal wire 47 is withdrawn from the probe 20 in order to take out a tunnel current.

Figure 4:
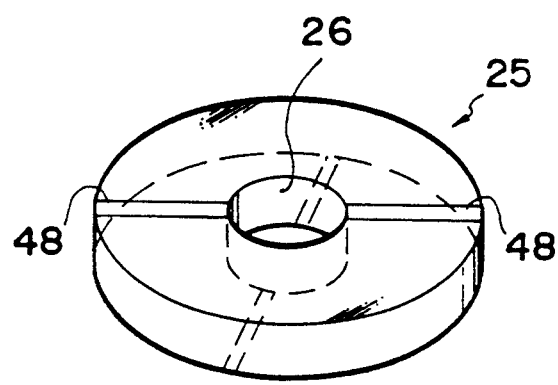
FIG. 4 is a perspective view of a transparent member.

A circular parallel plain glass 25 is positioned between the first and the second objective optical systems 33, 34 to cross the collimated optical flux. The parallel plain glass 25 is fixed in a circular opening 16a formed in the support plate 16. As shown in FIG. 4, a through hole 26 is formed in the center of the parallel plain glass 25 to hold the upper portion of the tube scanner member 21.

A plurality of transparent electrodes 48 are coated radially from the periphery of the through hole 26 on the both front and back faces of the tube scanner member. The transparent electrodes 48 electrically connect the electrode wires 45a–45b, the ground wire 46, and the tunnel current signal wire 47 to an unrepresented control circuit of the tunneling microscope. The transparent electrodes may be replaced by ordinary wires. The use of ordinary wires might cause a slight loss in quantity of light, but the loss will not affect an observation by the optical microscope.

Figure 5:
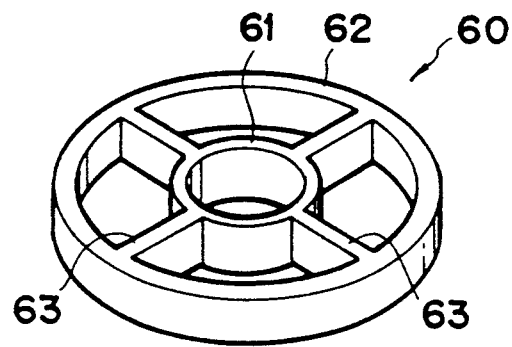
FIG. 5 is a perspective view to show a modification of the transparent member.
Figure 6:
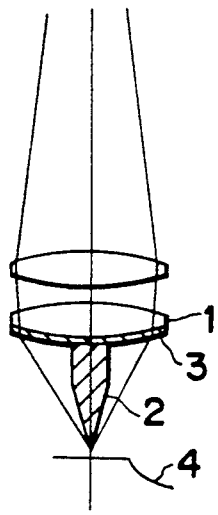
FIG. 6 is a sectional view of main part of a conventional composite scanning tunneling microscope.
Figure 7:
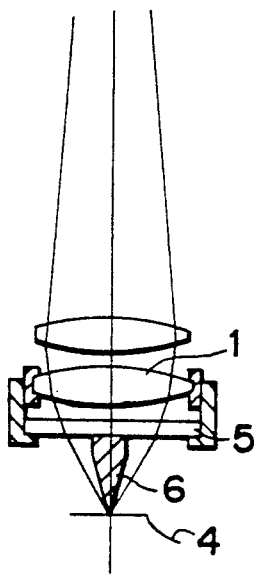
FIG. 7 is a sectional view of main part of another conventional composite scanning tunneling microscope.

Further, the parallel plain glass 25 itself may be replaced by a circular support frame 60 as shown in FIG. 5. The support frame 60 has an inside annular member 61, an outside annular member 62, and four radial arms 63 connecting between the annular members 61, 62. When the support frame 60 is used, preferable electrical connections to the electrode wires 45a–45d, to the ground wire 46, and to the tunnel current signal wire 47 are wiring with wires along the four arms 63.

In the present embodiment as described, the tunneling microscope and the optical microscope are independently supported on the vibration isolating table 12, so that vibrations may be minimized to transmit from the optical microscope to the tunneling microscope, enabling to observe a fine constitution of surface of sample in a resolving power of atom based on the detection of tunnel current.

Further, in case that the mount position of the probe is offset upon exchange of probe, a simple operation can adjust the optical microscope so as to bring the tip of probe within the focus of depth, because the objective optical system and the tube scanner member are so arranged as to be movable relative to each other along the optical axis.

Further, according to such an arrangement as the embodiments described, an outer diameter of the tube scanner member may be formed smaller, and the tunneling microscope has a good response upon scanning of sample with the probe.

What is claimed is:

1. A scanning tunneling microscope comprising:
    an objective optical system comprising a lens system opposed to a sample, said lens system having a through hole along an optical axis in a center thereof;
    a transparent member disposed on the optical axis on the other side of said lens system with respect to said sample; and
    a scanner member having one end vibrating to scan said sample while supporting a probe for detecting a tunnel current, and the other end held by said transparent member, said scanner member passing through the hole in said lens system without a contact therewith.

2. A scanning tunneling microscope comprising:
    a first objective optical system having a through hole along an optical axis in a center thereof and collimating an optical flux from a sample;
    a second objective optical system condensing the collimated optical flux from said first objective optical system;
    a transparent member disposed between said first and second objective optical systems; and
    a scanner member having one end vibrating to scan said sample while supporting a probe for detecting a tunnel current, and the other end held by said transparent member, said scanner member passing through the hole in said first objective optical system without a contact therewith.

3. A scanning tunneling microscope according to claim 2, wherein said transparent member comprises a transparent parallel plain plate with a hole in a center thereof, in which the other end of said scanner member fits.

4. A scanning tunneling microscope according to claim 2, wherein said transparent member has a central hole in which said other end of the scanner member fits, and a plurality of openings for light transmission formed to surround said central hole.

5. A scanning tunneling microscope according to claim 2, wherein said scanner member comprises a cylindrical piezoelectric member holding said probe at a tip thereof and electrode means disposed on circumferential planes of said piezoelectric member.

6. A scanning tunneling microscope comprising:
    a vibration isolating table;
    a first support member disposed on said vibration isolating table;
    an optical microscope disposed on said first support member, said optical microscope comprising a first objective optical system having a through hole along an optical axis in a center thereof and collimating an optical flux from a sample, and a second objective optical system condensing the collimated optical flux from said first objective optical system;
    a second support member disposed on said vibration isolating table independently of said first support member, said second support member comprising a transparent member disposed between said first and second objective optical systems; and
    a tunneling microscope disposed on said second support member, said tunneling microscope comprising a scanner member held by said transparent member and passing through the hole in said first objective optical system without a contact therewith, said scanner member having one end vibrating to scan said sample while supporting a probe for detecting a tunnel current and the other end held by said transparent member.

7. A scanning tunneling microscope according to claim 6, wherein said transparent member comprises a transparent parallel plain plate with a central hole, in which said other end of the scanner member fits.

8. A scanning tunneling microscope according to claim 6, wherein said transparent member comprises an inner annular member in which the other end of said scanner member fits, an outer annular member held by said second support member, and a plurality of radial arms connecting between said inner and outer annular members.

9. A scanning tunneling microscope according to claim 6, wherein said scanner member comprises a cylindrical piezoelectric member holding said probe at a tip thereof, and electrode means disposed on circumferential planes of said piezoelectric member.

* * * * *